United States Patent
Sorrentino

(10) Patent No.: US 10,263,734 B2
(45) Date of Patent: Apr. 16, 2019

(54) DEVICES AND METHODS FOR HANDLING BLIND (RE) TRANSMISSIONS IN A NETWORK

(71) Applicant: Telefonaktiebolaget LM Ericsson (publ), Stockholm (SE)

(72) Inventor: Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 67 days.

(21) Appl. No.: 15/030,263

(22) PCT Filed: Oct. 3, 2014

(86) PCT No.: PCT/SE2014/051146
§ 371 (c)(1),
(2) Date: Apr. 18, 2016

(87) PCT Pub. No.: WO2015/072905
PCT Pub. Date: May 21, 2015

(65) Prior Publication Data
US 2016/0248550 A1 Aug. 25, 2016

Related U.S. Application Data

(60) Provisional application No. 61/902,987, filed on Nov. 12, 2013.

(51) Int. Cl.
*H04L 1/08* (2006.01)
*H04L 1/18* (2006.01)
(Continued)

(52) U.S. Cl.
CPC .............. *H04L 1/189* (2013.01); *H04L 1/08* (2013.01); *H04W 72/0446* (2013.01);
(Continued)

(58) Field of Classification Search
CPC ...... H04L 1/189; H04L 1/08; H04W 72/0446; H04W 72/0453; H04W 76/02; H04W 84/18; H04W 28/26; H04W 92/18
See application file for complete search history.

(56) References Cited

U.S. PATENT DOCUMENTS 5,764,646 A * 6/1998 Dent ...................... H04L 1/1635
370/342
6,404,751 B1 * 6/2002 Roark .................... H04W 72/14
370/330
(Continued)

FOREIGN PATENT DOCUMENTS

WO 2008115289 A2 9/2008

OTHER PUBLICATIONS

International Search Report and Written Opinion dated Feb. 5, 2015 for International Application Serial No. PCT/SE2014/051146, International Filing Date—Oct. 3, 2014 consisting of 14-pages.
(Continued)

*Primary Examiner* — Kevin D Mew
(74) *Attorney, Agent, or Firm* — Patent Portfolio Builders, PLLC

(57) ABSTRACT

The embodiments described herein relate to a receiver device, a method therein, and a transmitter device and a method therein for handling (re) transmissions of packets in a network. The method performed by the receiver device comprises: receiving, from a transmitter device, a packet on at least one resource defined by a resource pattern that is known to both the transmitter device and receiver device; attempting to decode the received packet; and, if one or more retransmissions/receptions of the same packet occur before the decoding of process is completed; storing the one or more received packet or packets.

6 Claims, 7 Drawing Sheets

(51) Int. Cl.
*H04W 76/10* (2018.01)
*H04W 72/04* (2009.01)
*H04W 28/26* (2009.01)
*H04W 84/18* (2009.01)
*H04W 92/18* (2009.01)

(52) U.S. Cl.
CPC ............ *H04W 76/10* (2018.02); *H04W 28/26* (2013.01); *H04W 72/0453* (2013.01); *H04W 84/18* (2013.01); *H04W 92/18* (2013.01)

(56) References Cited

U.S. PATENT DOCUMENTS

| | | | | |
|---|---|---|---|---|
| 6,741,581 | B1* | 5/2004 | Sun | H04L 1/1812 370/338 |
| 7,075,913 | B1* | 7/2006 | Yavuz | H04B 7/264 370/335 |
| 7,088,701 | B1* | 8/2006 | Attar | H04L 1/0001 370/347 |
| 7,149,199 | B2* | 12/2006 | Sung | H04L 13/00 370/330 |
| 7,483,675 | B2* | 1/2009 | Kent | H04B 7/0857 370/208 |
| 9,397,735 | B2* | 7/2016 | Nammi | H04B 7/0417 |
| 9,893,865 | B2* | 2/2018 | Hsieh | H04L 5/0055 |
| 2001/0034209 | A1* | 10/2001 | Tong | H04L 1/0002 455/69 |
| 2002/0114401 | A1* | 8/2002 | Kim | H03M 13/2771 375/262 |
| 2002/0172162 | A1 | 11/2002 | Goodings | |
| 2002/0193106 | A1* | 12/2002 | Koo | H04L 29/06027 455/423 |
| 2003/0128705 | A1* | 7/2003 | Yi | H04L 1/1841 370/394 |
| 2004/0037251 | A1 | 2/2004 | Shneyour et al. | |
| 2005/0008026 | A1* | 1/2005 | Tanaka | H04L 1/0003 370/437 |
| 2005/0050424 | A1* | 3/2005 | Matsuura | H04L 1/0061 714/748 |
| 2005/0053035 | A1* | 3/2005 | Kwak | H04W 72/1268 370/331 |
| 2005/0180328 | A1* | 8/2005 | Kim | H04L 1/1812 370/236 |
| 2005/0181816 | A1* | 8/2005 | Han | H04W 52/325 455/522 |
| 2005/0190728 | A1* | 9/2005 | Han | H04B 7/2637 370/335 |
| 2005/0288053 | A1* | 12/2005 | Gu | H04W 52/12 455/522 |
| 2006/0002484 | A1* | 1/2006 | Miyazaki | H04L 1/1845 375/259 |
| 2006/0107165 | A1* | 5/2006 | Murata | H04L 1/1812 714/748 |
| 2006/0193398 | A1* | 8/2006 | Golitschek Edler Von Elbwart | H04L 1/0003 375/308 |
| 2007/0206531 | A1* | 9/2007 | Pajukoski | H04W 74/002 370/329 |
| 2008/0013599 | A1* | 1/2008 | Malladi | H04L 5/0007 375/132 |
| 2008/0080424 | A1 | 4/2008 | Torsner et al. | |
| 2008/0137689 | A1* | 6/2008 | Shiizaki | H04L 1/1887 370/498 |
| 2008/0176591 | A1* | 7/2008 | Fujimoto | H04L 1/1835 455/500 |
| 2008/0232403 | A1* | 9/2008 | Tsai | H04L 1/1845 370/473 |
| 2008/0301518 | A1* | 12/2008 | Miyazaki | H03M 13/116 714/752 |
| 2009/0055702 | A1* | 2/2009 | Kim | H04L 1/1819 714/748 |
| 2009/0097444 | A1* | 4/2009 | Lohr | H04W 72/14 370/329 |
| 2009/0327828 | A1* | 12/2009 | Ojala | H04L 1/1887 714/749 |
| 2010/0111139 | A1* | 5/2010 | Arnott | H04B 1/7143 375/133 |
| 2010/0202400 | A1* | 8/2010 | Richardson | H04W 8/005 370/330 |
| 2010/0241935 | A1* | 9/2010 | Ancora | H03M 13/2957 714/807 |
| 2010/0290419 | A1* | 11/2010 | Wengerter | H04W 72/042 370/329 |
| 2011/0026625 | A1* | 2/2011 | Susitaival | H04W 52/0251 375/260 |
| 2011/0059767 | A1* | 3/2011 | Parkvall | H04L 1/1635 455/550.1 |
| 2013/0064112 | A1* | 3/2013 | Liao | H04L 1/0003 370/252 |
| 2013/0223318 | A1* | 8/2013 | Liu | H04W 72/121 370/312 |
| 2013/0223400 | A1* | 8/2013 | Seo | H04J 11/005 370/329 |
| 2013/0336280 | A1* | 12/2013 | Nordstrom | H04L 5/0048 370/330 |
| 2014/0003262 | A1* | 1/2014 | He | H04W 28/08 370/252 |
| 2014/0185530 | A1* | 7/2014 | Kuchibhotla | H04W 76/023 370/329 |
| 2014/0245095 | A1* | 8/2014 | Nammi | H04L 1/1845 714/749 |
| 2014/0269767 | A1* | 9/2014 | Djukic | H04L 1/1896 370/474 |
| 2015/0280876 | A1* | 10/2015 | You | H04L 5/0048 370/329 |
| 2016/0036564 | A1* | 2/2016 | Krishnan | H04L 1/008 714/748 |
| 2017/0086194 | A1* | 3/2017 | Tavildar | H04W 72/0446 |
| 2018/0139014 | A1* | 5/2018 | Xiong | H04L 1/18 |

OTHER PUBLICATIONS

M.I. Hassan et al., "Effect of Retransmissions on the Performance of the IEEE 802.11 MAC Protocol for DSRC", IEEE Transactions on Vehicular Technology, vol. 61(1):22-34, ISSN_0018-9545, Publication Date: Oct. 20, 2011 consisting of 13-pages.

3GPP TR 22.803 V12.2.0 (Jun. 2013) 3rd Generation Partnership Project; Technical Specification Group Services and System Aspects; Feasibility Study for Proximity Services (ProSe) (Release 12) dated Jun. 28, 2013 consisting of 45-pages.

3GPP TSG-RAN WG1 Meeting #84, Tdoc R2-134238, Source: Ericsson, Title: "D2D Scheduling Procedure", Agenda Item: 7.5.3.1, Document for Discussion/Decision, Conference Location and Date: San Francisco, CA, USA, Nov. 11-15, 2013 consisting of 7-pages.

3GPP TSG RAN WG1 Meeting #75, R1-135115, Source: Intel Corporation, Title: "Discussion on D2D Resource Allocation Method", Agenda Item: 6.2.8.1.3, Document for Discussion and Decision, Conference Location and Date: San Francisco, CA, USA, Nov. 11-15, 2013, consisting of 5-pages.

3GPP TSG-RAN WG1 #75, R1-135322, Source: Qualcomm Incorporated, Title: "D2D Broadcast Resource Allocation and Interference Management Algorithms", Agenda Item: 6.2.8.1.3, Document for Discussion/Decision, Conference Location and Date: San Francisco, CA, USA, Nov. 11-15, 2013 consisting of 15-pages.

3GPP TSG-RAN WG1 Meeting #75, R1-135370, Source: ZTE, Title: "Study on D2D Resource ALlocation", Agenda Item: 6.2.8.1.3, Document for Discussion/Decision, Conference Location and Date: San Francisco, CA, USA, Nov. 11-15, 2013 consisting of 10-pages.

3GPP TSG RAN WG1 Meeting #77, R1-142398, Source: Ericsson, Title: "D2D Physical Channels Design", Agenda Item: 6.2.5-1.1, Document for Discussion and Decision, Conference Location and Date: Seoul, Korea, May 19-23, 2014 consisting of 10-pages.

(56) References Cited

OTHER PUBLICATIONS

EP office action in application No. 14861259.1 dated Mar. 6, 2018.

* cited by examiner

DEVICES AND METHODS FOR HANDLING BLIND (RE) TRANSMISSIONS IN A NETWORK

TECHNICAL FIELD

Embodiments herein relate to packet or channel (re) transmissions in general and particularly to devices and methods therein for handling blind (re)transmission of packets or channels in a network.

BACKGROUND

Device-to-device (D2D) communication is a well-known and widely used component of many existing wireless technologies, including ad hoc and cellular networks. Examples include Bluetooth and several variants of the IEEE 802.11 standards suite such as WiFi Direct. These systems or technologies operate in unlicensed spectrum.

Recently, D2D communications as an underlay to cellular networks have been proposed as a means to take advantage of the proximity of communicating devices and at the same time to allow devices to operate in a controlled interference environment.

It is suggested that such a device-to-device communication shares the same spectrum as the cellular system, for example by reserving some of the cellular uplink resources for device-to-device purposes. Allocating dedicated spectrum for device-to-device purposes is a less likely alternative as spectrum is a scarce resource and (dynamic) sharing between the device-to-device services and cellular services is more flexible and provides higher spectrum efficiency.

Devices that want/wish to communicate, or even just discover each other, typically need to transmit various forms of control signaling. One example of such control signaling is the discovery signal; which may include a full message e.g. a synchronization message or a beacon; which at least carries some form of identity and is transmitted by a device that wants/wishes to be discoverable by other devices. Other devices may scan for the discovery signals. Once they have detected the discovery signal, they may take the appropriate action, for example to try to initiate a connection setup with the device transmitting the discovery message.

Multiple discovery signals from different user equipments (UEs), being an example of a device, are multiplexed on the same radio resources in a combination of Time Division Multiplexing (TDM), Frequency Division Multiplexing (FDM) and/or Code Division Multiplexing (CDM). Even though details are not agreed yet at the standardization meeting e.g. 3GPP or IEEE, it is likely that discovery signals be multiplexed on specific subframes occurring at known (or signaled) positions in a radio frame. Similarly to the discovery signals, it is envisioned that UEs transmit channels for data and/or control information.

Resources for transmission of data and/or control channels (including discovery) may be assigned by a controlling node or be defined according to pre-configured patterns.

In general, each channel from each UE occupies a subset of the available time/frequency resources and possibly code resources in the system.

Since interference at the receiver in a D2D system may happen in a stochastic and partially uncontrollable/unpredictable fashion, it is understood [1] that frequency and/or time diversity is beneficial in the resource patterns used for each physical channel.

One approach is to avoid transmitting the (data or control) packets with the same periodicity by all transmitters (devices) in the system or network and they should span different portions of the spectrum. Possibly, code patterns may be exploited, too.

An example of time and frequency diversity achieving transmission patterns are shown in FIG. 1 as described in [1], see FIG. 10 in [1]. [1] is a 3GPP document disclosing simulation results and proposals and details relating to D2D broadcast resource allocation and interference managements algorithms. More details on the time and frequency diversity schemes may be found in [1] section 3.2.5, wherein it is described system level impact of frequency and time diversity on D2D Voice Over IP (VOIP) packet (re)transmissions.

Another known consideration is that unpredictable interference may occasionally prevent reception of specific packets for a certain channel from a certain transmitter device. Since all packets need to be correctly decoded in order to correctly convey information at the receiver device, retransmissions of the same packet are useful to improve system reliability.

For certain channels, feedback-based ACK/NACK mechanism may not be available (e.g., control channels, broadcast communication channels, discovery channels, etc.). In these cases, a possible approach is to provide blind retransmissions, i.e. transmit the same payload or packet multiple times on different resources, possibly with different encoding parameters (redundancy versions). Under certain conditions the receiver device might be able to reconstruct the correct information based on reception of at least one of the retransmissions of the same packet.

Devices or UEs need to be able to detect and/or decode physical channels that they are potentially interested in. Especially the decoding process takes a significant processing time, comparable to the length of some subframes. The longer the processing time, the higher the energy/power consumption at the receiver device and this leads to shortening battery life at the receiver device. Current implementations are already highly optimized and it is not likely that UEs will implement even faster decoding algorithms for the purpose of D2D channels detection.

The currently discussed randomization algorithms might result in more restrictive latency requirements on the decoders, since the random retransmissions might occur at any time due to time randomization.

It should be mentioned that among the most computationally demanding functions in the receiver device equalizer block and the decoder block as explained above, which are sometimes implemented by taking advantage of highly optimized and hardly upgradable hardware accelerators. These blocks, among others, contribute to the detection latency in the UEs. Currently, in Long Term Evolution (LTE) UEs have a time budget of about 4 ms for detection of an incoming DownLink (DL) data channel, due to that the feedback channel(s) carrying detection acknowledgements are by design spaced in time from the data reception subframes.

Further, due to the sometimes unpredictable and highly dynamic interference patterns of direct channels and due to constraints in the UEs (e.g., reception may be impossible during transmission) there exist significant chances that a receiver device or UE is not able to detect a certain Layer 1 (L1) data packet (i.e., a subframe carrying a direct channel) even though the transmitter device or UE is in proximity of the receiver.

SUMMARY

An object of embodiments herein is to alleviate at least one of the problems disclosed earlier by e.g. adopting blind (re)transmissions of packets e.g. Layer 1 data and/or control packets, according to e.g. pseudo-random resource patterns for improving receiver device performance as well and transmitter device performance.

The object of embodiments herein comprises providing a method performed in a receiver device as a well as a receiver device for handling reception of at least one packet from a transmitter device. The object of embodiments herein also comprises providing a method performed in a transmitter device as a well as a transmitter device for handling (re)transmissions of at least one packet to a receiver device.

According to an aspect of exemplary embodiments, at least some of the above stated problems are solved by means of a method performed by a receiver device, the method comprising: receiving, from a transmitter device, a packet, wherein the packet is transmitted by said transmitter device on at least one resource defined by a resource pattern that is known to both the transmitter device and receiver device; attempting to decode the received packet; and if, according to the resource pattern, one or more retransmissions/receptions of the same packet occur before the decoding of said received packet is complete; storing the one or more received packet or packets.

According to another aspect of exemplary embodiments, at least some of the above stated problems are solved by means of a receiver device comprising a receiver unit configured to receive, from a transmitter device, a packet, wherein the packet is transmitted by said transmitter device on at least one resource defined by a resource pattern that is known to both the transmitter device and receiver device; processing unit configured to attempt decoding the received packet; and if, according to the resource pattern, one or more retransmissions/receptions of the same packet occur before the processing unit completes the decoding of said received packet; storing, in a memory of the receiver device, the one or more received packet or packets.

According to yet another aspect of exemplary embodiments, at least some of the above stated problems are solved by means of a method performed by a transmitter device. The method comprising: transmitting, to a receiver device, a packet on at least one resource defined by a resource pattern that is known to both the transmitter device and the receiver device; and retransmitting, according to the resource pattern, the same packet to the receiver device, the retransmission occurring after a time that is larger than or equal to a predetermined time-interval.

According to yet another aspect of exemplary embodiments, at least some of the above stated problems are solved by means of a transmitter device comprising a transmitter unit configured to transmit a packet, to a receiver device, on at least one resource defined by a resource pattern that is known to both the transmitter device and the receiver device; and the transmitter unit is further configured to retransmit, according to the resource pattern, the same packet to the receiver device after a fix time that is larger than or equal to a predetermined time-interval.

An advantage achieved by the embodiments herein is to exploit blind (re)transmissions of direct packets or channels while relaxing latency constraints on a receiver device and/or a detector/decoder.

Another advantage includes definition of pseudo-random time patterns that respect minimum time interval between consecutive (re)transmissions of the same signal or packet or channel.

DETAILED DESCRIPTION

Figure 1:
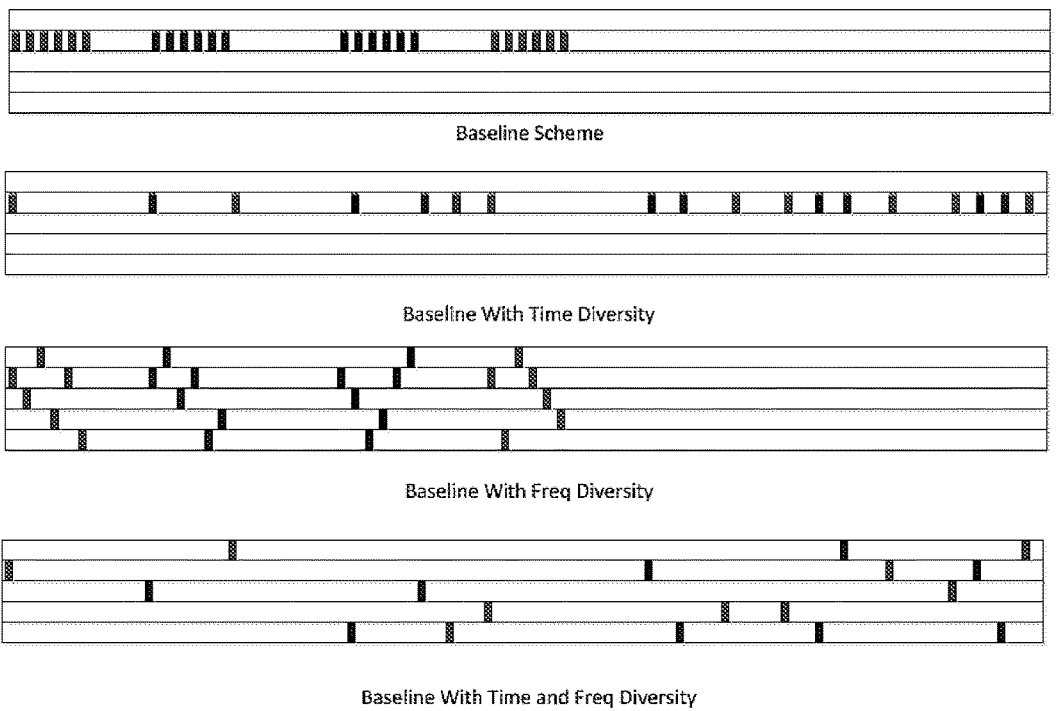
FIG. 1 depicts example(s) of time and frequency diversity achieving transmission patterns.

The network wherein the embodiments herein are applied may use access technologies supporting D2D communications or UE2UE communications, such as e.g. Long Term Evolution, LTE-Advanced, Wideband Code Division Multiple Access (WCDMA), High Speed Packet Access (HSPA) Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Although the terminology from Third Generation Partnership Project (3GPP) LTE is used in this disclosure to exemplify the different embodiments, this should not be seen as limiting the scope of the embodiments to only the aforementioned system. Other wireless systems, including WCDMA, UTRA FDD, UTRA TDD, WiMax, WLAN, UMB and GSM/GERAN/EDGE, may also benefit from exploiting the ideas covered within this disclosure.

Also note that terminology such as eNodeB and UE or device should be considering non-limiting and does in particular not imply a certain hierarchical relation between the two; in general "eNodeB or eNB" could be considered as device 1 and "UE" device 2, and these two devices communicate with each other over some radio channel. Further by transmitter device or transmitter UE is meant a device or a UE capable is transmitting a signal or packet or a channel to another device. Hence the transmitter device is not restricted to only transmitting a signal or packet or a channel. It may also receive a signal or packet or a channel from another device and hence acts as a receiver device or receiver UE. Also, the exemplary embodiments herein may be applied to any channel; not necessarily direct D2D channels.

Worth mentioning is that it is beneficial that resources for transmission of direct channels between UEs or devices are commonly known by both the transmitter and the receiver prior to the actual transmission. This allows the receiver device to, e.g., only attempt detection/decoding of the resources potentially carrying interesting information, resulting in computational and energy saving by use, e.g., of DRX. Hence, according to exemplary embodiments herein, a resource on which a packet is transmitted is defined by a resource pattern that is known to the transmitter device and to the receiver device.

In case of direct channels meaning direct communications with devices without involving a radio node (such as an access point or a eNB or a radio base station in general), it is sometimes beneficial to pseudo-randomize such resources by use of, e.g., combinations of time, frequency and codes. Such resource patterns might be pre-defined in a specification or generated in real-time based on parameters common to the transmitter and receiver(s) devices. Control signalling from the transmitter to the receiver(s) devices or from one or more controlling radio nodes or devices may be exploited to convey information about the patterns to be used.

Blind (re)transmissions of a given layer 1 (L1) packet or a signal or a channel occupy resources defined by a resource pattern which, as mentioned above, is known to both the transmitter device and the receiver device. Below is described the case where a L1 packet is transmitted. However, any number of layers and/or types of packets (data and/or control) may be considered. Hence the embodiments herein are not restricted to a specific type or form or format of a packet and also not restricted to a specific layer.

According to an exemplary embodiment taking into account e.g. transmission of a L1 packet by a transmitter device, the receiver device is configured to attempt detection and/or decoding of the n-th (re)transmission of a certain L1 packet; n can take any value from 2, 3, 4 etc.

If according to the selected transmission resources pattern one or more retransmissions of the same L1 packet occur before the detection/decoding processing at the receiver device of the n-th packet is complete, the receiver device is configured to receive and memorize the received signals/packets corresponding to such additional retransmission(s).

If detection/decoding of the n-th (re)transmission fails, the receiver device takes advantage of the further retransmissions that are memorized in a further detection/decoding attempt. The multiple retransmissions may be combined in a hard or soft fashion. Soft combination means that the multiple retransmissions are combined before binary bits are generated.

On the other hand if the receiver device succeeds in detecting/decoding of the n-th (re)transmission, the receiver device is configured to discard from decoding the additional retransmissions that have been stored.

An advantage of the above described exemplary embodiment is that detection latency and retransmission time-patterns can be decoupled. Even though retransmissions or retransmitted packets are stored or memorized thereby leading to computational burden on the device, exploitation of blind (re)transmissions of direct channels (i.e. between UEs or devices) is improved and at the same time the latency constraints on a receiver device and/or a detector is relaxed.

Figure 3:
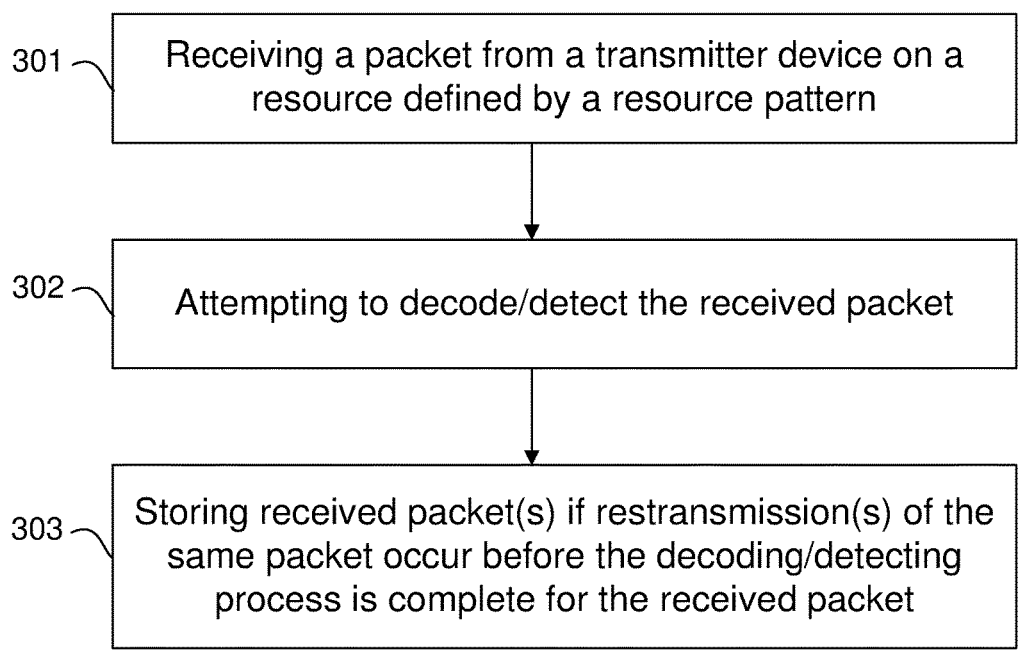
FIG. 3 illustrates a method in a receiver device in accordance with some exemplary embodiments herein.

Hence according to an exemplary embodiment and with reference to FIG. 3, a method performed by a receiver device comprises: receiving 301 a packet or a signal or a channel from a transmitter device; attempting 302 to detect and/or decode the received packet or signal or channel. If, according to a selected transmission resource(s) pattern, the receiver device receives, from the transmitter device, one or more retransmissions of the same packet or same signal or same channel before the detection and/or decoding process is complete of the previous packet or previous signal or previous channel (e.g. the first packet or first signal or first channel); the method further comprises: storing 303 and/or memorizing the received packet(s) or signal(s) or channel(s) corresponding to said retransmission(s).The received packets including both the initially received packet and the retransmitted packet.

According to an embodiment, the resource pattern is defined such that a time interval between successive retransmissions of the same packet is larger than or equal to a predetermined time-interval as will be explained below.

Figure 2:
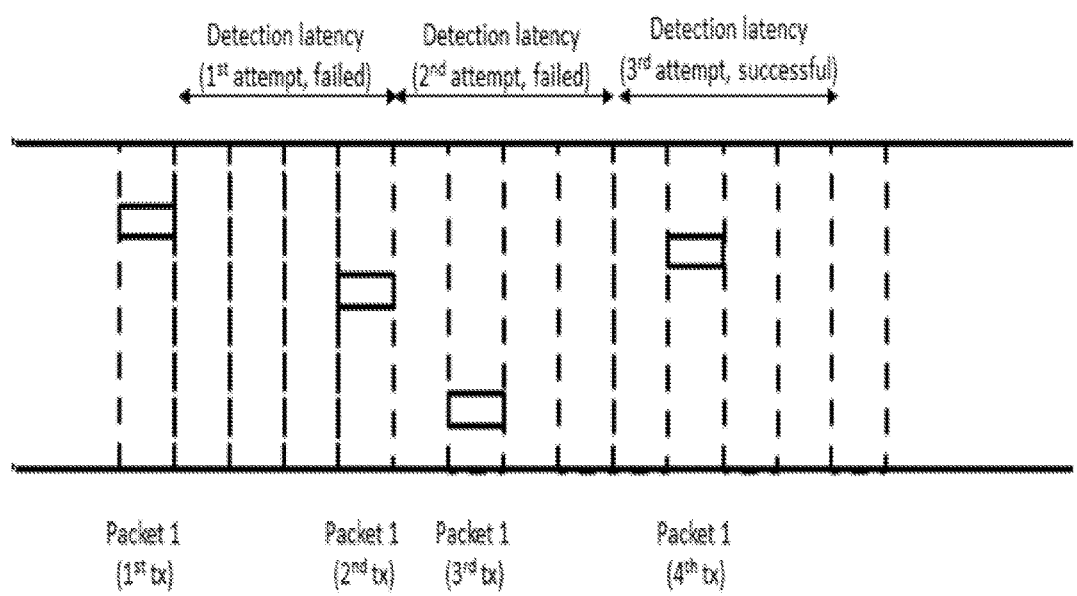
FIG. 2 shows an example including transmissions of 4 packets to a receiver and also showing a time-interval between transmissions of the same packet.

FIG. 2 illustrates an example embodiments according to the one described above. In FIG. 2, four (re)transmissions (tx:s) of the same packet are considered as an example. These packets are stored at the receiver device. However only the first 3 packets are here considered to be processed in the detection/decoding. As shown, attempts 1 and 2 to detect and/or decode packet(s) fail during the detection latency window, whereas the third attempts is shown successful. There may be different reasons why the first two attempts fail. For example the wireless channel may be in a fading dip during the first two transmissions and it is in more favourable conditions during the third transmission. Another possibility is that the demodulator and/or decoder combine the transmissions in order to progressively increase the quality of the received signal, until the quality and/or the number of received coded bits is sufficient to correctly decode the original message.

The detection latency is in, according to embodiments herein, associated to the time required for receiving a transmission a packet or channel; processing it; attempting its detection and determining whether it is successfully decoded or not. Such latency is mostly determined by the type of processing and by the capabilities of the receiver, as well as by the reception algorithms being used.

Assuming for example that the detection latency window of the receiver is 4 slots following reception of packet 1 ($1^{st}$ tx). The decoding process starts at slot 1 and continues at slot 2 and 3. But as shown, the same packet 1 ($2^{nd}$ tx) is received at slot 4 i.e. before the decoding/detecting process is completed. After the receiver has completed the decoding of the $1^{st}$ transmission, it determines that the $1^{st}$ attempt failed (e.g., because the channel was in bad conditions as explained before). The first and second packets are stored. The detection/decoding process starts again with a second attempt, and as shown, the same packet 1 ($3^{rd}$ tx) is received before the decoding/detecting process is completed. In this example, also the second attempt fails (possibly because both the $1^{st}$ and $2^{nd}$ transmission experienced bad channel conditions), and the $3^{rd}$ packet packet is also stored. During the $3^{rd}$ attempt, the decoding process is successful. This is because the channel quality during the $3^{rd}$ attempt was sufficiently good, or because the combination of signals and coded bits from the $1^{st}$, $2^{nd}$ and $3^{rd}$ attempts are sufficient to determine successful detection of the payload.

According to a second exemplary embodiment, the resource patterns for (re)transmission of a given L1 packet are designed in such a way that the time interval between successive retransmissions is not constant and it is not lower than a certain threshold (minimum time-interval) i.e. it is larger than or equal to a predetermined time-interval. In an example, successive transmissions of the same (L1) packet are spaced at least X ms (e.g. 4 ms). 4 ms is just an example. Such value roughly indicates the L1 detection processing time of existing LTE UEs or devices. The constrained time-randomization proposed here may be combined with any other randomization pattern, e.g., in code and frequency domains. Hence, said patterns may be viewed as pseudo-random time or resource patterns that respect minimum time interval between consecutive (re)transmissions of the same signal or packet or channel.

Figure 4:
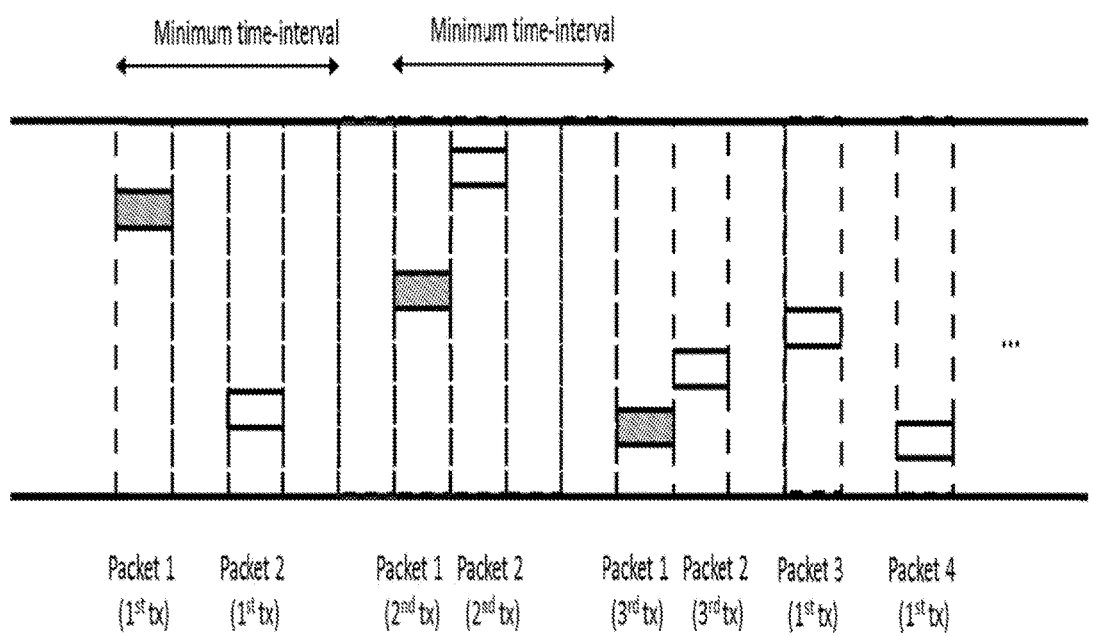
FIG. 4 shows an example wherein each packet is transmitted multiple times with an irregular pattern.

FIG. 4 shows an example where each L1 packet is transmitted multiple times with an irregular-time pattern. I.e., the transmitter device is configured to transmit each packet or signal or channel, to a receiver device, multiple times with an irregular-time pattern. However successive retransmissions of the same L1 packet are spaced by a minimum time-interval which can be fixed or adapted. Such time-interval is a design parameter and maybe implemented in the device and or signalled to the device from a network node or from another device. FIG. 4 shows an example where the time between transmissions of Packet 1 (shown with lines upward diagonal) is larger than the minimum time-interval.

For a given packet size, the minimum time-interval parameter combined with the number of retransmissions may reduce or limit the throughput. However, if the receiver device is provided with multiple parallel detectors and/or decoders, retransmissions of multiple L1 packets may be interleaved on the resources. Hence in accordance with an exemplary embodiment the transmitter and/or the receiver device is/are provided with at least two parallel detectors and/or decoders in order to achieve the above.

In an example herein, the time-patterns associated to transmission of multiple L1 packets are assigned in such a way that only one packet is transmitted by each transmitter device or UE in each subframe. This is to avoid violating the single-carrier constraint at the transmitter device. Hence in accordance with an exemplary embodiment, the transmitter device is configured to transmit only one packet in each subframe.

According to yet another exemplary embodiment, the resources associated to different L1 packets that are transmitted by the same transmitter device UE are not subject to the minimum time-interval constraint, since it is assumed that different L1 packets are associated to different Hybrid Automatic Repeat reQuest (HARQ) processes and thus different detectors and/or decodes in the device or UE implementation.

Again, the use of L1 packets above is only an example. Hence the exemplary embodiments herein are not restricted to packets, meaning that any type of packets or signals or channels may be used when applying the teachings herein.

It should be mentioned that yet another advantage with the embodiments herein is that the implementation and cost benefits are achieved by reusing large parts of existing device or UE software and hardware also for reception of direct packets and/or channels, although something that is not necessarily supported in current Release 11 of 3GPP or up to Release 11 3GPP standardization specifications.

Figure 5:
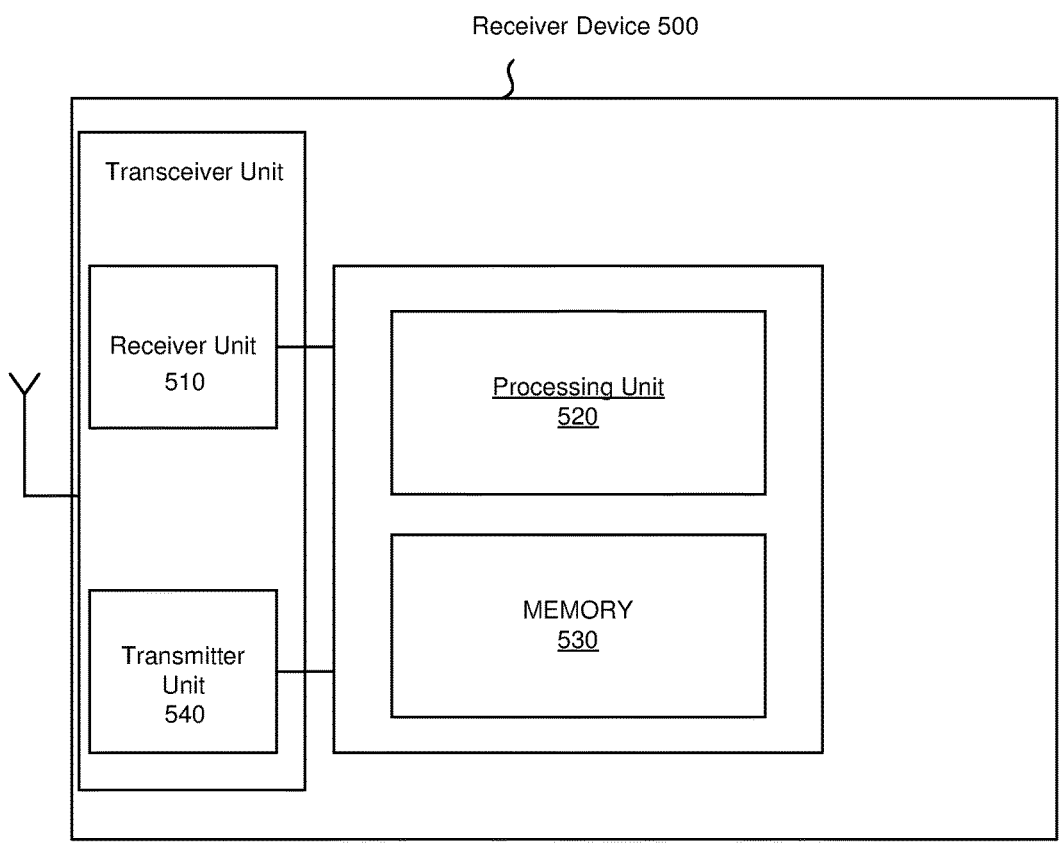
FIG. 5 illustrates a block diagram depicting a receiver device according to exemplary embodiments herein.

FIG. 5 illustrates an exemplary block diagram depicting a receiver device 500 according to exemplary embodiments herein. The device 500 may also act as a transmitter device. The receiver device 500 comprises a receiver unit/circuit 510 configured to receive a packet or a signal or a channel from a transmitter device. The receiver device 500 also comprises a memory 530. The packet transmitted by the transmitter device is done on at least one resource defined by a resource pattern that is known to both the transmitter device and receiver device 500. As shown, the receiver device 500 further comprises a processing unit 520 configured to attempt to decode and/or detect the received packet or signal or channel. If, according to a selected transmission resource(s) pattern, the receiver device 500 receives, from the transmitter device, one or more retransmissions of the same packet or same signal or same channel before the decoding and/or detection process is complete, the receiver device 500 is configured to store in the memory 530 the received packet(s) or signal(s) or channel(s) corresponding to said retransmission(s). It should be mentioned that the initially received packet may also be stored in the memory 530 in addition to the subsequently received packet corresponding to said retransmission(s).

If the processing unit 520 fails in decoding the received packet during the decoding process, the processing unit 520 is configured to decode the stored packet(s). If the processing unit 520 successfully decodes the received packet within the decoding process time, the processing unit 520 is configured to discard from decoding stored packet(s).

The receiver device 500 may further comprise an antenna as shown which may be internal or external. Other units/circuits may be included. For example, the device 500 further comprises a transmitter unit/circuit 540 which may be part of the receiver unit 510 forming a transceiver. Further details and functions of the device have already been described and not repeated here.

Figure 6:
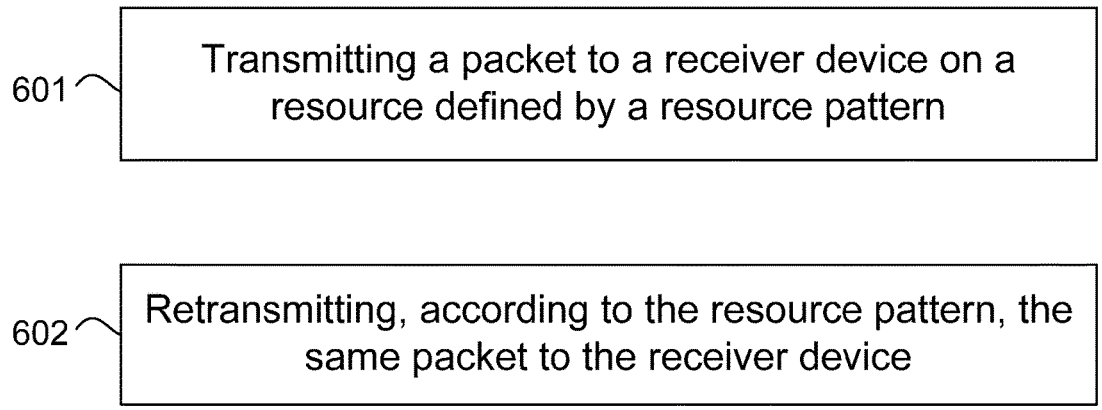
FIG. 6 illustrates a method in a transmitter device in accordance with some exemplary embodiments herein.

As previously described, embodiments herein also relate to a method in a transmitter device and to a transmitter device. FIG. 6 illustrates a method performed by the transmitter device. The method comprising: transmitting 601, to a receiver device, a packet on at least one resource defined by a resource pattern that is known to both the receiver device and the transmitter device; and retransmitting 602, according to the resource pattern, the same packet to the resource device, the retransmission occurring after a time that is larger than or equal to a predetermined time-interval e.g. after a fix period of time (e.g. 4 ms) as explained previously.

Figure 7:
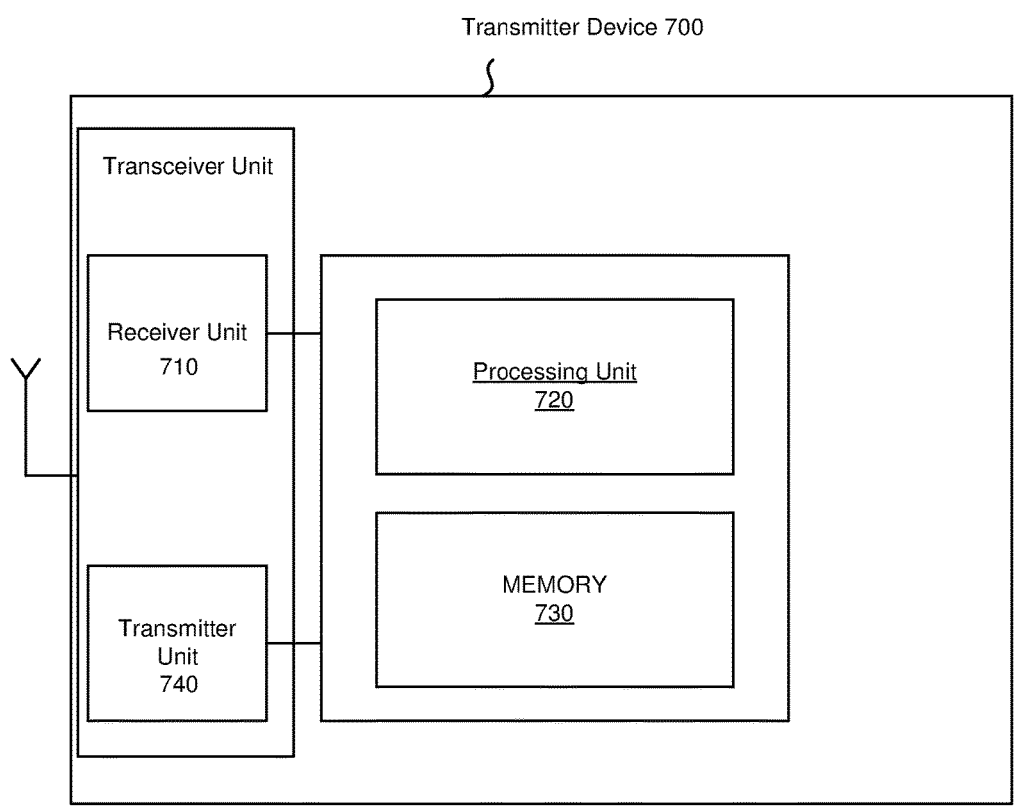
FIG. 7 illustrates a block diagram depicting a transmitter device according to exemplary embodiments herein.

Referring to FIG. 7 there is illustrated a transmitter device 700 according to exemplary embodiments herein. The transmitter device 700 comprises a transmitter unit/circuit 740 which may be part of a receiver unit 710 forming a transceiver unit. The transmitter unit 740 is configured to transmit a packet or signal or channel to a receiver device, on at least one resource defined by a resource pattern that is known to both the transmitter device 700 and the receiver device. The transmitter unit/circuit 740 is further configured to retransmit, according to the resource pattern, the same packet or signal or channel after a fix period of time (e.g. 4 ms) to the receiver device as explained before.

Further the time interval between successive transmissions is not necessarily constant and is not necessarily lower than a certain threshold (minimum time-interval), Hence, the fix period of time is larger than or equal to a predetermined time-interval threshold (minimum time-interval). So the resource pattern is defined such that a time interval between successive retransmissions of the same packet is larger than or equal to the predetermined time-interval. As shown the transmitter device 700 further comprises a memory 730 and a processing unit 720. Further details have been described and therefore it is considered unnecessary to repeat them.

It should be mentioned that the embodiments herein may be implemented through one or more processors or processing units e.g. processing circuit or unit of the device or UE together with a computer program code for performing the functions and/or method steps of the embodiments. The program code mentioned above may also be provided as a computer program product, for instance in the form of a data carrier carrying computer program code for performing embodiments or method steps described herein when being loaded into the device(s) or in a network node. One such carrier may be in the form of a CD ROM disc. It is however feasible with other data carriers such as a memory stick. The computer program code may furthermore be provided as pure program code on a server and downloaded to the device(s) or network node.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Throughout this disclosure, the word "comprise" or "comprising" has been used in a non-limiting sense, i.e. meaning "consist at least of". Although specific terms may be employed herein, they are used in a generic and descriptive sense only and not for purposes of limitation.

REFERENCE

[1] 3GPP TSG-RAN WG1 #75 R1-135322, entitled "D2D broadcast resource allocation and interference management algorithms", "Qualcomm".

The invention claimed is:

1. A method performed by a receiver device, the method comprising:
  receiving, from a transmitter device, a packet, the packet being transmitted by the transmitter device on at least one resource defined by a pseudo-random resource pattern that is known to both the transmitter device and the receiver device, wherein the pseudo-random resource pattern includes randomization patterns of time, frequency, and codes, and wherein the pseudo-random resource pattern is defined such that a time interval between successive retransmissions, corresponding to at least one reception, of the same packet is at least equal to a predetermined time-interval;
  attempting to decode the received packet;
  if, according to the pseudo-random resource pattern, the at least one reception of the same packet occurs after the decoding of the received packet is started and before the decoding of the received packet is complete:
    storing the at least one received same packet; and
  if the decoding of the received packet fails:
    decoding the stored at least one same packet.

2. The method according to claim 1, further comprising:
  if decoding of the received packet succeeds, discarding from decoding the stored at least one same packet.

3. A receiver device, comprising:
  a receiver unit configured to receive, from a transmitter device, a packet, the packet being transmitted by the transmitter device on at least one resource defined by a pseudo-random resource pattern that is known to both the transmitter device and the receiver device, wherein the pseudo-random resource pattern includes randomization patterns of time, frequency, and codes, and wherein the pseudo-random resource pattern is defined such that a time interval between successive retransmissions, corresponding to at least one reception, of the same packet is at least equal to a predetermined time-interval;
  a processing unit configured to attempt decoding of the received packet;
  if, according to the pseudo-random resource pattern, the at least one reception of the same packet occurs after the decoding of the received packet is started and before the processing unit completes the decoding of the received packet:
    the processing unit is configured to store in a memory of the receiver device, the at least one received same packet; and
  if the processing unit fails in successfully decoding the received packet:
    the processing unit is configured to decode the stored at least one same packet.

4. The receiver device according to claim 3, wherein if the processing unit successfully decodes the received packet, the processing unit is configured to discard from decoding the stored at least one same packet.

5. A method performed by a transmitter device, the method comprising:
  transmitting, to a receiver device, a packet on at least one resource defined by a pseudo-random resource pattern that is known to both the transmitter device and the receiver device, wherein the pseudo-random resource pattern includes randomization patterns of time, frequency, and codes, and wherein the pseudo-random resource pattern is defined such that a time interval between successive retransmissions of the same packet is at least equal to a predetermined time-interval; and
  retransmitting, according to the pseudo-random resource pattern, the same packet to the receiver device, wherein the retransmitted same packet is received and stored at the receiver device after decoding of the transmitted packet is started and before the decoding of the transmitted packet is complete, and wherein the stored same packet is decoded by the receiver device, in response to a failure in the decoding of the transmitted packet.

6. A transmitter device, comprising:
  a transmitter unit configured to:
    transmit a packet, to a receiver device, on at least one resource defined by a pseudo-random resource pattern that is known to both the transmitter device and the receiver device, wherein the pseudo-random resource pattern includes randomization patterns of time, frequency, and codes, and wherein the pseudo-random resource pattern is defined such that a time interval between successive retransmissions of the same packet is at least equal to a predetermined time-interval; and
    retransmit, according to the pseudo-random resource pattern, the same packet to the receiver device, wherein the retransmitted same packet is received and stored at the receiver device after decoding of the transmitted packet is started and before the decoding of the transmitted packet is complete, and wherein the stored same packet is decoded by the receiver device, in response to a failure in the decoding of the transmitted packet.

* * * * *